United States Patent Office 3,312,053
Patented Apr. 4, 1967

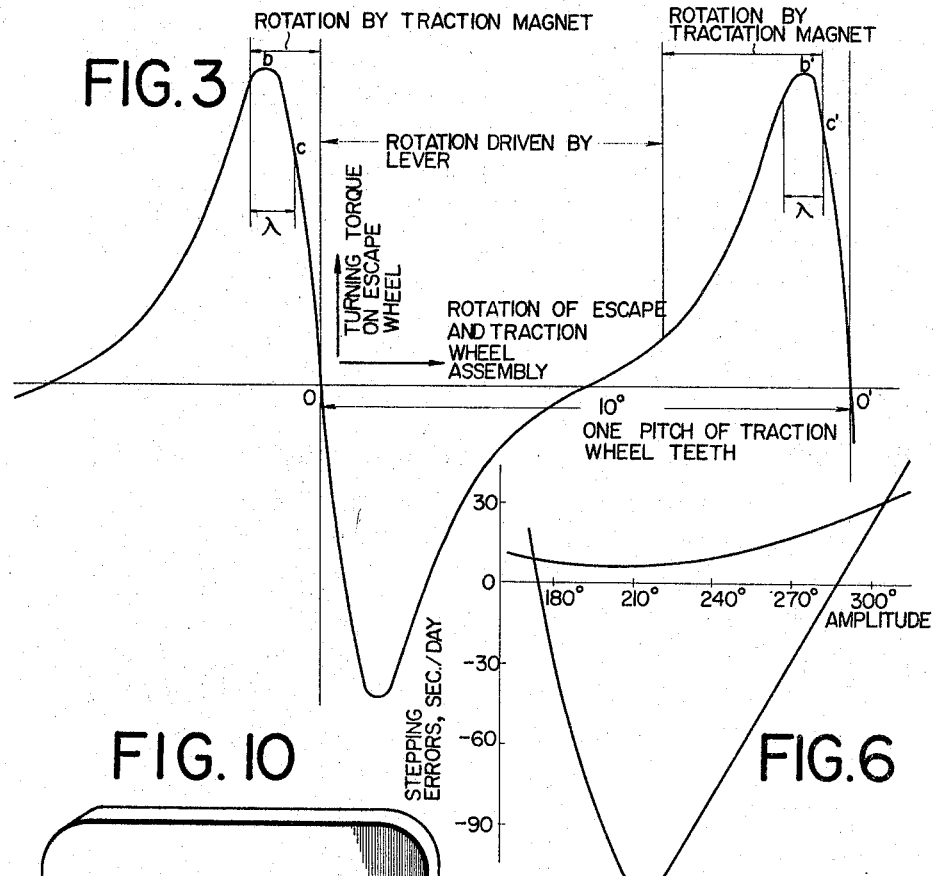
FIG. 3
FIG. 6
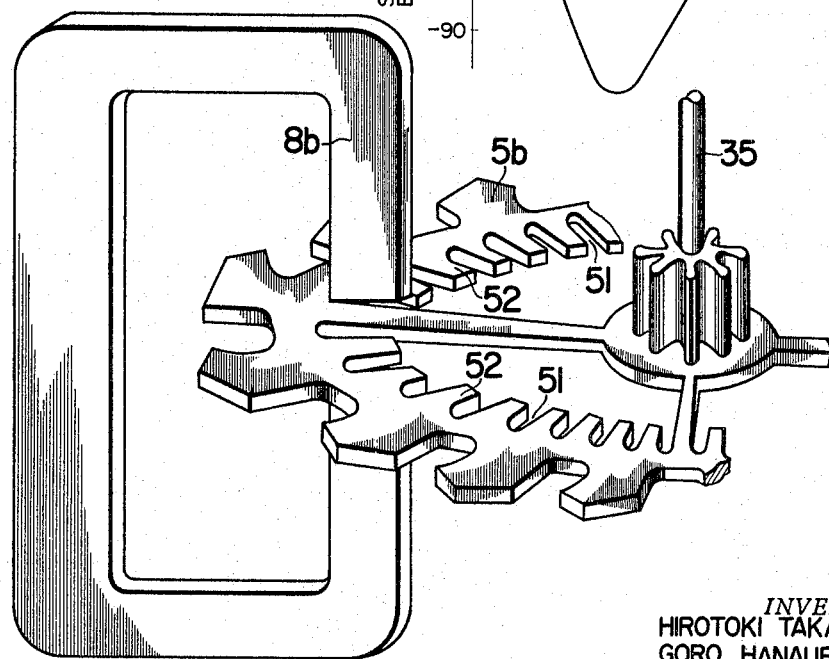
FIG. 10

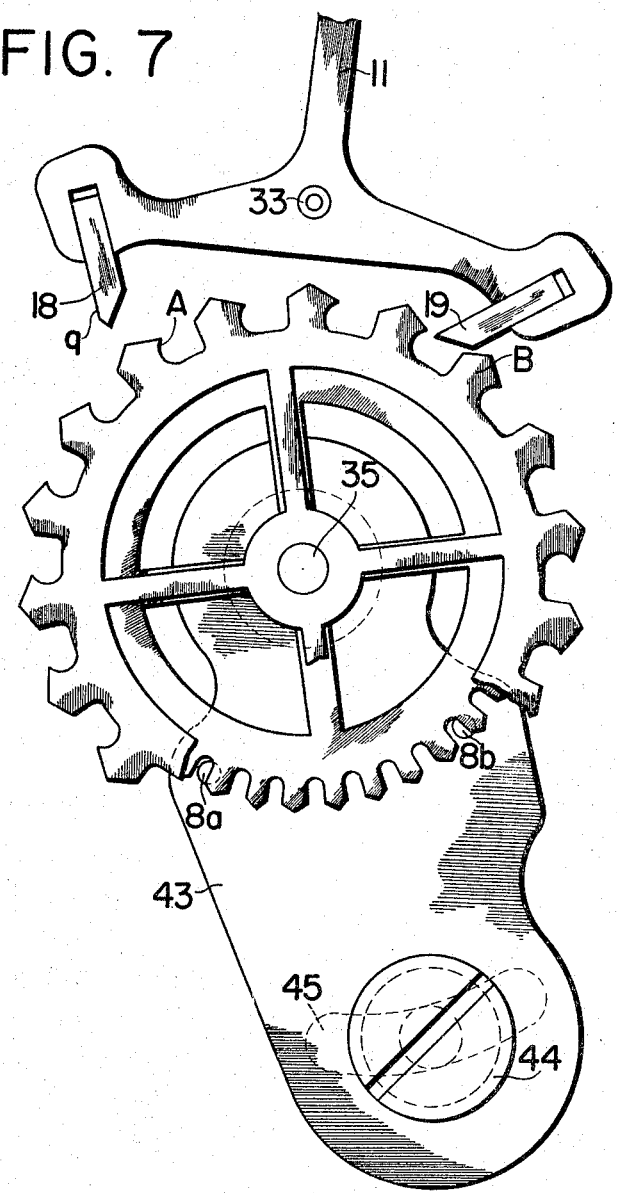

3,312,053
STEP BY STEP DRIVE MECHANISM FOR TIMEPIECE
Hirotoki Takamune, 39—1 Kamihoyashinden, Hoyamachi, Kitatama-gun; Goro Hanaue, 893 2-chome, Kamiochiai, Shinjuku-ku; and Yoshifumi Mochizuki, 1468 5-chome, Kyonancho, Musashino-shi, all of Tokyo-to, Japan
Filed Dec. 7, 1965, Ser. No. 512,072
Claims priority, application Japan, Feb. 19, 1965, 40/9,629, (utility model) 40/313,229
5 Claims. (Cl. 58—28)

This invention relates to improved step by step mechanisms for timepieces, especially watches, which are provided with a drive type balance for driving the time indicator gear train through the intermediary of the lever and an escapement-type index wheel, wherein the balance is fitted thereon with at least a permanent magnet so as to cooperate with stationary search and drive coils, said coils being arranged in turn to cooperate with a transistor oscillator circuit for reciprocatingly driving the balance. The balance is provided with a roller assembly carrying an impact pin for oscillatingly driving a swingable lever which is arranged so as to cooperate with a driven wheel for driving it in a regularly stepping mode.

In order to provide the lever with a pair of pallets ready for meshing with the teeth of the escape wheel, it is absolutely necessary to accurately establish and maintain the extreme positions of the oscillating stroke of the lever. For this purpose, banking pins are provided on both sides of the lever and secured to the pillar plate for mechanically limiting the lever oscillation to a precisely predetermined range. In order that the lever fork shall function correctly, it must be temporarily in its terminal positions during the swings of the balance, as commonly known to those skilled in the art.

A proposed measure for this purpose is to make the banking pins from magnetized material and at the same time to provide a light soft-iron armature, for instance, a pin on the lever fork, so as to be attracted by the magnetic impact pins, as disclosed in U.S. patent specification 2,669,089.

An alternative measure hitherto proposed is to provide a larger permanent magnet of a specific configuration in the neighborhood of the balance as disclosed in U.S. patent specification 2,964,901.

With use of such prior magnetic attraction means, adverse effects have been encountered in that the stray magnetic fluxes emanating from the attracting magnets act upon the oscillating balance, espectially the hair spring thereof.

It is therefore the main object of the present invention to provide an improved drive mechanism wherein magnetically adverse effects of the attracting magnets for the lever upon the balance can be substantially obviated.

Another object is to provide a drive mechanism of the above kind, capable of magnetically compensating the reversing rotation of the index wheel as appearing at each release of the entry pallet from engagement with the wheel.

Still another object is to provide a drive mechanism of the above nature, capable of providing an easy adjustment of the magnetic traction means for the escapement and thus the lever.

Still further object is to provide a drive mechanism of the above kind, capable of damping the otherwise severe impact shocks as appearing at the engaging instant of the exit pallet with the index wheel.

These and further objects, features and advantages of the present invention will become clear as the description proceeds in consulation with accompanying drawings wherein several preferred embodiments of the invention are stated only by way of example for the purpose of illustration of the invention, therefore, in no way of limiting sense for the invention.

In the drawings:
FIG. 1 is a schematic longitudinally sectional view of a first embodiment of the present invention, illustrated in combination with a drive balance.

FIG. 3 is a diagrammatic chart showing the driving and magnetic attracting effort exerted upon the escape or index wheel, being plotted against a partial rotational angle of the latter.

FIG. 6 is a chart showing comparative performance curves of isochronism between a conventional mechanism and an inventive one.

FIG. 7 is a similar view to FIG. 2, showing a slightly modified mechanism from the foregoing.

FIGS. 8 and 9 are a longitudinally sectional view and a top plan view of essential parts of a second embodiment of the invention, and FIG. 10 is a partial perspective view of a slightly modified arrangement of the foregoing mechanism shown in FIGS. 8 and 9.

Figure 1:
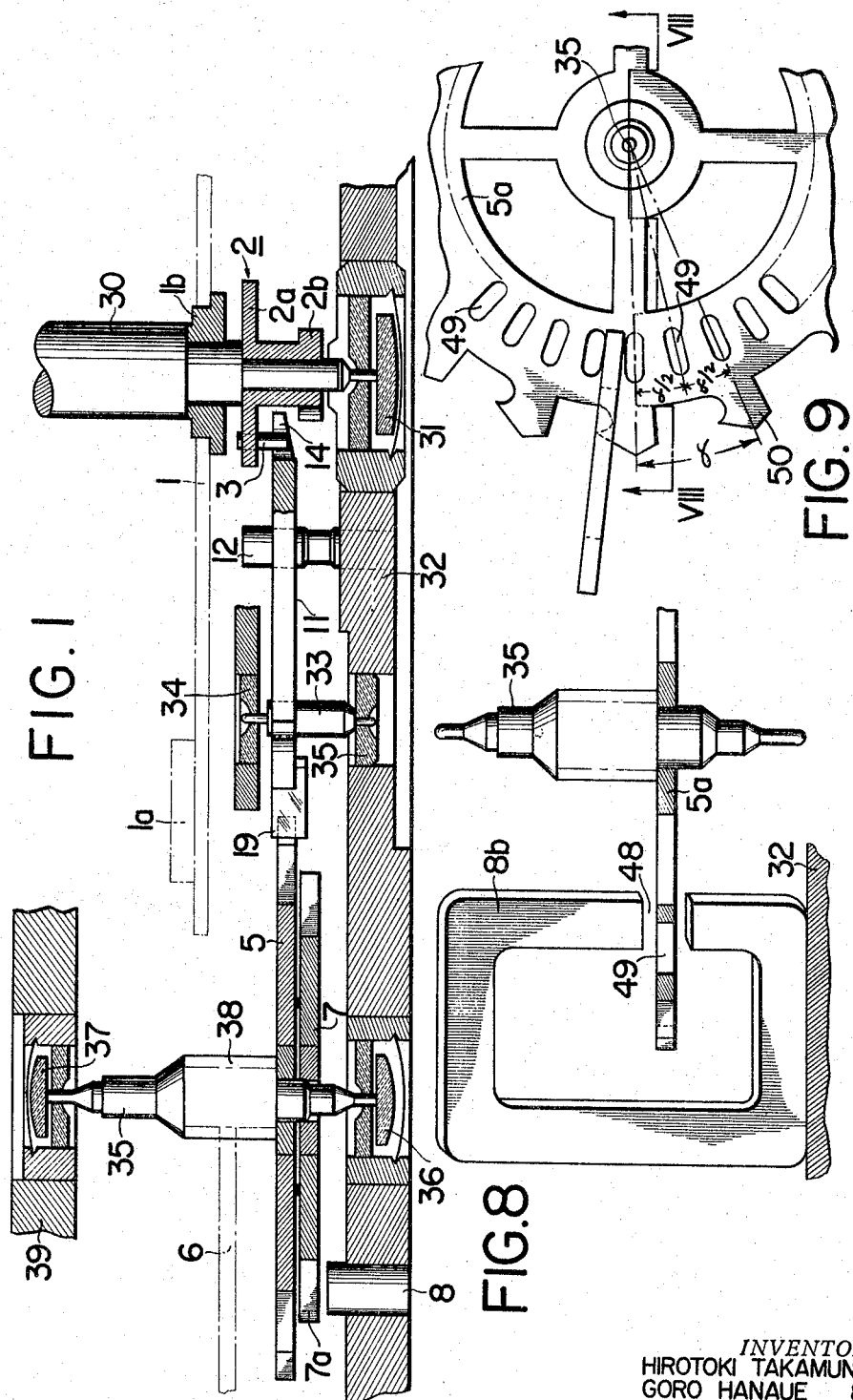
Figure 2:
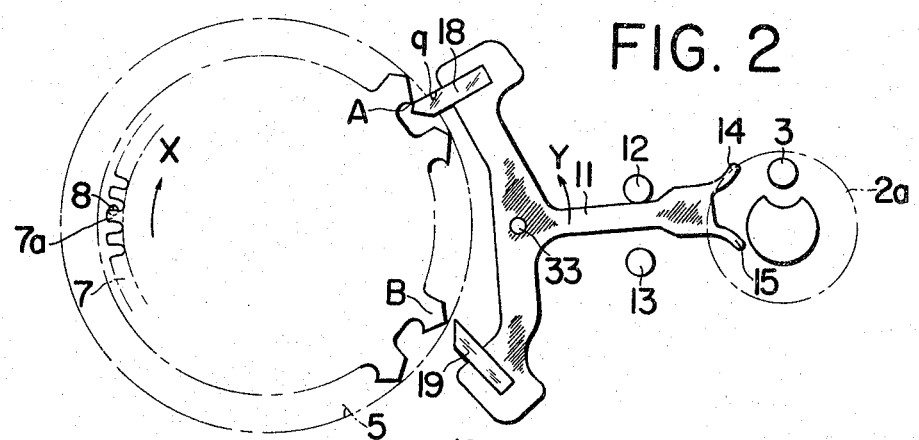
FIG. 2 is a simplified and schematic top plan view of essential parts shown in FIG. 1, as appearing at a stopped moment of the timepiece to which the embodiment shown in FIG. 1 is fitted.

Now referring to the accompanying drawings, especially FIGS. 1 and 2 thereof, 1 denotes a driving balance carrying thereon one or more permanent magnets 1a so as to cooperate with a search and a drive coil, not shown, arranged in a close proximity thereto yet separated a distance therefrom, as conventionally. The search coil is arranged to feed induced currents to an electronic oscillator circuit, not shown, and the drive coil is fed therefrom with amplified currents for keeping the balance in an angular oscillatory movement, as is commonly known. Therefore, the balance 1 and its magnets 1a (only one of which is shown in the drawing) are illustrated herein schematically by chain lines. The boss, as at 1b, of the balance is rigidly fixed to a shaft 30, the reduced lowest end of latter being rotatably supported on a thrust and radial jewel bearing 31. This bearing 31 is in turn supported rigidly in pillar plate 32 of a small timepiece such as a watch, while the upper end of the shaft 30 is rotatably supported in a bridge, not shown.

A conventional roller 2 comprising a larger and a smaller roller flange 2a and 2b, respectively, is fixedly mounted on the balance shaft 30 and carries thereon an impulse pin 3. In FIG. 2, the outline of the larger flange 2a is shown only by a chain-lined circle for simplification.

A lever fork 11 is oscillatingly mounted by means of its shaft or pallet arbor 33 which is rotatably supported by means of upper and lower bearings 34 and 35. The oscillatory movement of the lever is limited at its both extremities by non-magnetic banking pins 12 and 13, as conventionally. The lever is formed at its one end with a pair of fork arms 14 and 15 so as to be acted alternatively upon by the impulse pin 3. This lever is further provided with two lever pallets, more specifically the entry pallet 18 and the exit pallet 19.

An index wheel 5 is mounted fixedly on a rotatable spindle 35 on which pinion 38 is integrally formed. The spindle 35 is mounted in a lower bearing 36 and an upper bearing 37, the former being mounted in the lower pillar plate 32 and the latter in the upper pillar plate which is shown only partially as at 39. Concentrically and in phase with the index wheel, there is provided a traction wheel 7 made from a magnetizable material such as steel or the like and having projecting teeth 7a with a half relative pitch in comparison with that of the index wheel. At a diametrically opposite position of the both wheels 5 and 7 to the lever 11, a permanent magnet 8, preferably shaped in a rigid cylinder as shown, is provided and mounted rigidly in the lower plate 32 so as to magnetically cooperate with any of the projecting teeth 7a on the traction wheel. As conventionally, the pinion 38 meshes drivingly with a wheel 6 of the gear train of the watch movement, said wheel 6 being illustrated only schematically in the drawing for simplicity.

The general power-transmitting and step regulating mode of the aforementioned assembly is similar to those of conventional type, with exception of magnetic traction operation which will be described more fully hereinafter.

Briefly and more specifically, the drive balance is brought into angular reciprocating motion during the operation of the watch, and motion is transmitted through the roller assembly 2 and impact pin 3 to the pallet lever 11 which is thus caused to oscillate around the arbor 33, the extremities of the oscillating movement being limited by the banking pins 12 and 13. This motion is converted into an intermittent rotary movement of drive wheel 5 and thus pinion 38. The stepped rotary movement of the pinion is then transmitted to the gear train through the last member 6 thereof so as to drive the conventional time indicator mechanism of the watch, although not shown.

The mode of the assembly shown in FIG. 2 corresponds to the stopped condition of the watch. In this case, the leading side edge of one of projections 7a coincides with the center of the drawing magnet 8 when seen in FIG. 2, thus the torque exerted magnetically upon the wheel assembly 5, 7 in the feeding direction as hinted by a small arrow X is largest, provided that the impulse pin 3 occupies a remote position from contact with either of fork arms 14 or 15.

In this case the locking edge $q$ of the entry pallet 18 is urged by the engaging corner as at A of the index wheel teeth so as to rotate the lever 11 in the counterclock direction as hinted by a small arrow Y in FIG. 2 against one of the banking pins as at 12. Thus, the lever is kept positively at this extreme position of its rocking range. At the same time, the index wheel is checked by the pallet 18 from over-running and positioned in its predetermined correct phase for assuring the optimum possible engaging condition with the other pallet 19.

In FIG. 3, the drawing effort of the traction magnet 8 upon the traction wheel 7, and thus upon the escape wheel 5, is diagrammatically shown. In this chart, the distance between two separated points O and O' on the abscissa represents a pitch of teeth on the traction wheel, while the ordinate represents the turning effort exerted upon the index wheel, including that provided by the lever. The positive sign represents the feeding direction of the index wheel. The both points O and O' represent those of the traction magnet, at which the magnetic traction force acting upon the wheel 7 is of least value or practically nil. At these positions, the magnet will occupy a balanced position relative to two successive teeth on the traction wheel, as shown by way of example in FIG. 4. In this case, the magnet is placed in a space between two successive teeth when seen from above as in the case of FIG. 4. It will be seen that the magnetic traction force exerted by the stationary magnet 8 upon the wheel assembly 5, 7 will periodically vary with a predetermined period corresponding to the distance O–O' when converted into a corresponding time interval. For assuring the unitary motion of the both wheels 5 and 7, these wheels are united into one by spot welding. The point $c$ or $c'$ shown in FIG. 3 corresponding to the relative position of traction magnet 8 shown in FIG. 2, said both points lying in close proximity of the maximum peak points $b$ and $b'$, respectively.

Figure 4:
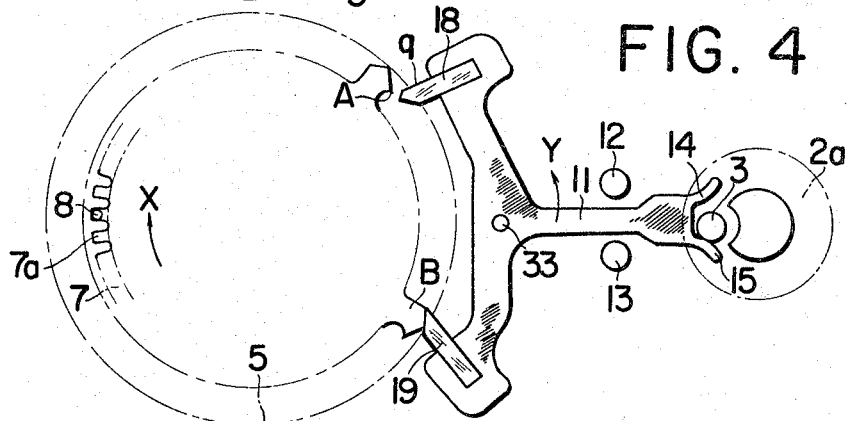
FIGS. 4 and 5 are similar views to FIG. 2, showing two different positions of the lever relative to the index wheel.

At the relative position shown in FIG. 4, the lever 11 is released from locking and about to initiate its feed movement. In this case, motion is transmitted from the drive balance 1 through shaft 30 to roller assembly 2 so as to rotate the large roller 2a and impact pin 3 from the position of FIG. 2 to that shown in FIG. 4, whereby the pin is brought into impact engagement with the said arm 15. By this impulsive effort, the entry pallet 18 on the lever is released from engagement with the escape tooth corner A against the locking effort exerted thereby and, instead, the exit pallet 19 is brought into engagement with a corresponding tooth as at B of the index wheel so as to exert a feed movement thereto. During the release movement of the entry pallet, a slight reverse movement of the index wheel is caused to take place as denoted by a small angle $\lambda$ (FIG. 3) ranging from point $c$ (or $c'$) to $a$ (or $a'$) lying at the both sides of the wave peak $b$ (or $b'$) in proximity thereof. Instantly upon release of the entry pallet in the aforementioned sense, this reversed movement of the index wheel is compensated by the aforementioned magnetic effort exerted in the feeding direction by the traction magnet 8. This measure serves for recovering the loss caused by the said initial reverse and ineffective rotation of the index wheel, and, in addition, for damping the engaging impact between the exit pallet and index wheel tooth B. So far as the driving impulsive torque is transmitted from the balance 1, the exit pallet 19 will continue to feed the index wheel 5 in the feeding direction through the cooperating engagement between the contact faces $p$ and $p'$ of the pallet 19 and tooth B.

Figure 5:
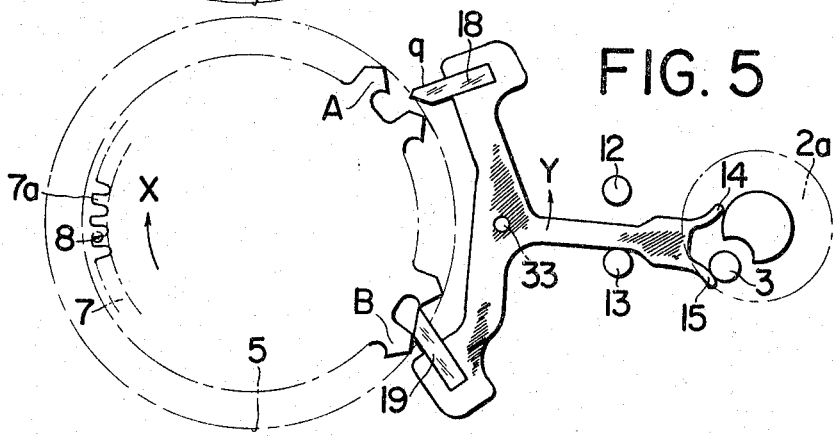

In FIG. 5, the relative position of lever 11 and wheel assembly 5, 7 upon completion of a stepping feed is schematically shown. The traction force exerted magnetically by the magnet 8 through traction wheel 7 upon the index wheel 5 corresponds to an intermediate point $e$ on the curve length ranged between points $d$ and $a'$ shown in FIG. 3. Even upon disengagement of the exit pallet 19 from the cooperating tooth B, the wheel assembly 5, 7 will continue to over-run by the traction force exerted by the stationary magnet 8, assisted by the turning inertia owned by the rotating wheel assembly itself, until it will arrive at the preliminary stop position shown in FIG. 2, so as to make a small pause. Next, the aforementioned oscillating stroke is carried out in the reverse order by the reversed oscillation stroke of the balance. Then, the aforementioned is repeated again and again urged by the oscillating movement of the drive balance.

In this way, the balance may perform in an accurate manner the desired escape and drive function for intermittently driving the watch gear train.

In FIG. 6, two comparative curves are shown. Curve I denotes experimental results of a drive balance in combination with the index and traction wheel assembly fitted with the aforementioned traction magnet 8. Curve II shows experimental results of a similar arrangement to the above, wherein however the traction magnet 8 has been dispensed with and instead the banking pins have been made from an alloy having a great remanence and a high coercive force. In this case, a steel pin has been studded on the respective zone on the lever stem for magnetic cooperation with these magnetic banking pins. It will be seen that the arrangement so far described hereinbefore provides superior effects in the view point of isochronism of the watch.

In FIG. 7, schematically illustrated in correspondence to FIG. 5, a slightly modified embodiment from that illustrated in the foregoing is shown. In the present modification, there are provided two separated traction magnets 8a and 8b, instead of the sole one denoted by 8 in the foregoing. The purpose and function of these magnets are same as before. In addition, these magnets 8a and 8b are indirectly mounted on the lower pillar plate, or more specifically through the intermediary of a pivotably adjustable arm plate 43 which is mounted slidably on the lower pillar plate and mounted concentrically with the wheel assembly 5, 7 for swivel movement around the spindle 35. The adjusted position may be fixed by tightening a set screw 44. For this purpose, the lower plate 32 may preferably be formed with a slot 45 for shiftably receiving this screw. In this figure, further similar parts are denoted by same reference numerals as before so that the design and function of these parts could be easily understood from the foregoing description.

In a second embodiment shown in FIGS. 8 and 9, the additional traction wheel as at 7 shown in FIGS. 1, 2, 4, 5 and 7 has been dispensed with and the traction magnet has been made substantially in a yoke as at 8b which is formed with a small air gap 48 embracing, with plays, an index wheel 5a. The yoke magnet 8b is mounted on the lower plate 32. If necessary, the magnet may be mounted through the intermediary of an intermediate movable slide on the plate 32 so as to provide an adjusting possibility relative to the index wheel. There is formed a number of elongated openings 49 arranged in a complete circle around the spindle 35 and cut through the disc of the index wheel, said openings having a predetermined circumferential pitch precisely one half that of the peripheral projections 50 of the escape wheel 5a. When one of the openings 49 is brought into registration with the air gap 48, the traction force magnetically acting upon the wheel 5a will become largest and the operating mode may be similar to that shown in FIG. 2. On the other hand, when the intermediate bridge formed between two successive openings 49 is brought into registration with the air gap 48, the traction force will become least and thus the operating mode of the arrangement will be similar to that shown in FIG. 4. Further constructional and functional features may be similar to those described so far and thus omitted herefrom.

In FIG. 10, a slightly modified embodiment from that shown in FIGS. 8 and 9 is illustrated, wherein each of the elongated openings 49 is transformed in an internal recess 51 and thus the index wheel 5b is formed with a complete circle of internal projections 52 as in the similar manner to an internal gear. Further parts of this modification may be similar to those shown in the foregoing and thus no further detailed description thereof may be omitted without adversely affecting upon the understanding of the nature and function of the present modification.

The invention thus provides an improved indexing drive wheel assembly well adapted for being driven from a drive type balance, and capable of operating at more accurate steps for driving the time-indicating mechanism of a small timepiece, especially a watch, than conventional by suppressing and obviating substantially otherwise possible adverse magnetic influences upon the balance, especially hair spring thereof, exerted by the magnetic locking means for the pallet lever.

The specific and preferred several embodiments described above and illustrated in the drawings are intended to be merely representative and are obviously susceptible of modification in form and detail. The invention, therefore, is not to be limited thereto but is to be regarded as embracing all modifications falling within the scope of the appended claims.

We claim:

1. In a drive mechanism, comprising a lever, an arbor for the lever, a stationary pillar plate, stationary banking pins on opposite sides of said lever providing stop positions on said plate, said lever being swingable on its arbor between said pins, a pair of entry and exit pallets fixedly mounted on said lever, an index wheel rotatably mounted in close proximity of said pallets for driven cooperation therewith, the provision of a permanent magnet made substantially in the form of a yoke having an air gap embracing said wheel and mounted on said plate and on opposite side of said wheel to said lever, and a number of perforations cut through the body of said wheel and arranged in a complete circle concentrically therewith, said perforations having a half peripheral pitch relative to that of peripheral projections on said wheel and arranged in phase therewith, said magnet being adapted for urging said lever to its locked positions through the intermediary of said wheel and for compensating positively a slight reversed rotation of said wheel to its regular feeding direction as appearing at each release of said entry pallet from engagement with said wheel.

2. In a step by step drive mechanism, comprising a lever, an arbor for the lever, a stationary pillar plate, stationary banking pins on opposite sides of said lever providing stop positions on said plate, said lever being swingable on its arbor between said pins, a pair of entry and exit pallets fixedly loaded on said lever, wheel means having a number of peripheral teeth formed thereon and rotatably mounted in close proximity to said pallets for cooperation with said teeth, stationary and permanent magnetic means mounted on the substantially diametrally opposite side of said wheel means from said lever, said wheel means having a plurality of magnetizable areas alternately arranged with a plurality of air gaps in a circular path concentric with said peripheral teeth, said magnetizable areas having a circular pitch half the circular pitch of said teeth and adapted to be disposed in superimposed relation with said magnetic means upon rotation of said wheel means, said magnetic means and said magnetizable areas of said wheel means cooperable to urge said wheel means in a direction to lock said lever against one of said banking pins and to positively compensate a slight reverse rotation of said wheel means with respect to the normal direction of rotation of said wheel means which occurs at each release of said pallet from engagement with said peripheral teeth, said urging effort being a maximum when said magnetic means is in a partial superimposed position with respect to one of said magnetizable areas.

3. A step by step drive mechanism as set forth in claim 2 wherein said magnetic means is comprised of a single cylindrical magnet mounted with the longitudinal axis thereof parallel to the axis of said wheel means.

4. A step by step drive mechanism as set forth in claim 3 wherein said magnetic means is comprised of a pair of cylindrical magnets mounted with the axes thereof parallel to the axis of said wheel means.

5. A step by step drive mechanism as set forth in claim 4 wherein said pair of cylindrical magnets are mounted on a plate means which in turn is mounted for rotation about the axis of said wheel means, said plate means being provided with locking means adapted to lock said plate means in an adjusted position relative to said pillar plate.

References Cited by the Examiner

UNITED STATES PATENTS 3,143,848    8/1964    Biemiller et al. _____ 58—28

FOREIGN PATENTS 1,003,814    9/1965    Great Britain.

RICHARD B. WILKINSON, *Primary Examiner.*

GERALD F. BAKER, *Examiner.*